UNITED STATES PATENT OFFICE.

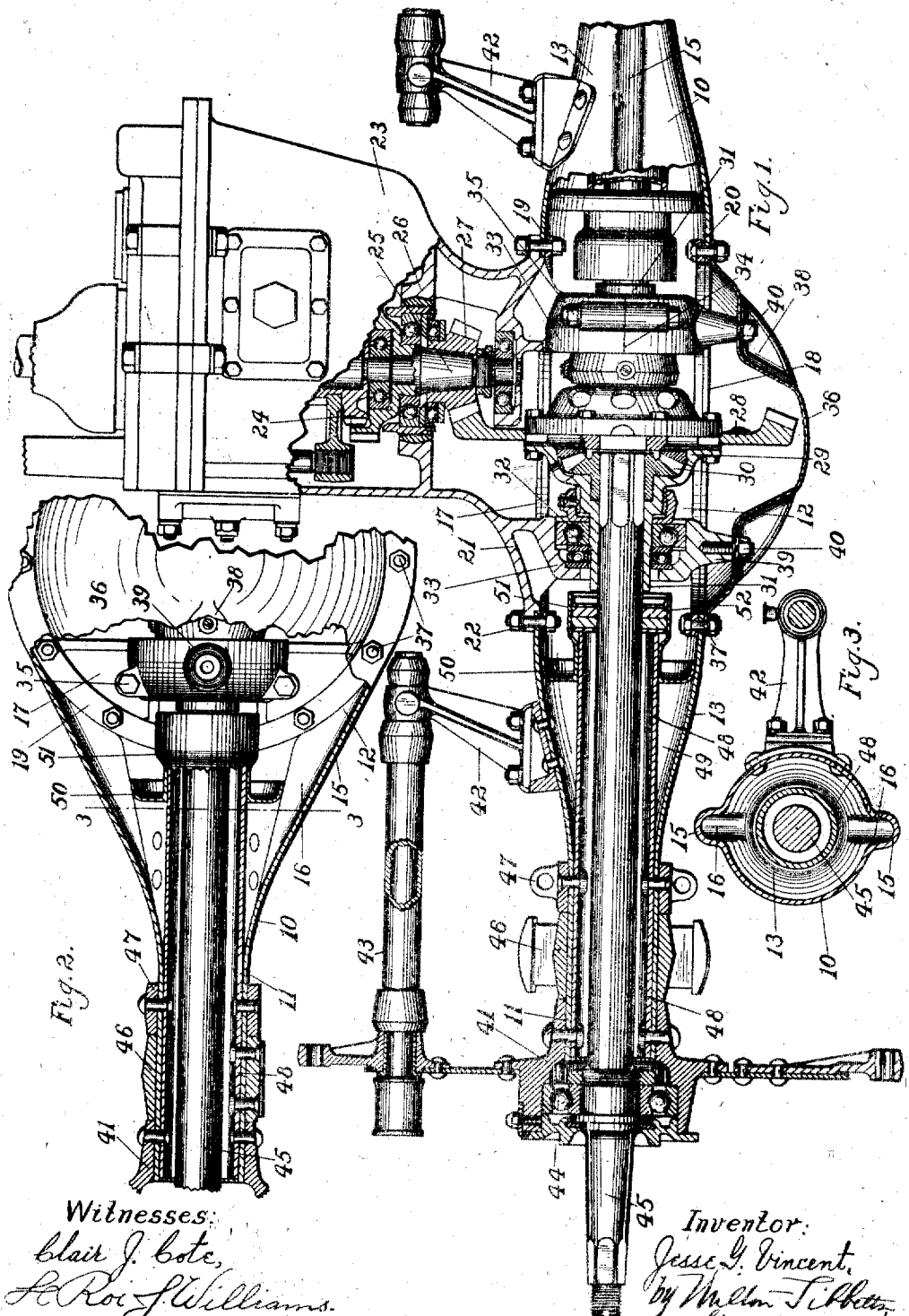

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,230,450.     Specification of Letters Patent.     Patented June 19, 1917.

Application filed June 6, 1913. Serial No. 772,126.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles, and particularly to the axle construction of such vehicles.

One of the objects of this invention is to provide an axle structure of great strength, one that is a commercial manufacturing proposition, and one in which the bearings of the shaft and gearing are assured of permanent alinement.

These and other objects are attained in the axle structure shown and described in this application, which structure shows one of several embodiments of the invention that may be designed.

In the drawings,

Figure 1 is a horizontal sectional view through an axle structure illustrating this invention, parts being shown in elevation;

Fig. 2 is a vertical section of the left half of the axle shown in Fig. 1; and

Fig. 3 is a section substantially on the line 3—3 of Fig. 2.

The invention is illustrated in an axle structure which embodies not only the differential and driving axles, but also the transmission case or change speed gearing mounted on the front of the axle proper.

The axle casing is indicated at 10, and it is preferably formed by stamping its front and rear halves from sheet metal and electrically or otherwise welding the two halves together so that the outer ends form cylindrical portions 11, the central part is enlarged, as at 12, and the intermediate portions are tapered, as at 13. Where the weld is formed along the top and bottom of the tapered portion of the axle casing a rib 15 is preferably formed to give greater strength to the structure. These ribs are also preferably double walled so that they form channels 16 inside the casing for a purpose hereinafter more fully explained.

The central enlarged portion of the axle casing is flattened front and rear, and registering openings 17 and 18 are formed therein, respectively. The edges of these openings are reinforced by means of rings 19 and 20 which may, if desired, be welded to the casing. The front opening 17 is closed by a cover 21 removably secured thereto by a series of bolts 22 passing through the cover, the edge of the casing and the ring 19. This cover 21 is extended forwardly in the form of a housing 23 which contains the transmission or speed changing mechanism of the vehicle, parts of this mechanism being shown at 24, where the casing is broken away. Also the pinion driving shaft 25 is shown as mounted in the wall 26 of the casing, and the pinion 27 meshes with the bevel gear 28, which is mounted upon the differential housing 29. The differential housing contains the usual differential gears 30 and is formed with oppositely extending sleeves 31 which are mounted in bearings in bearing supports or lugs 33 which extend into the central enlarged portion of the casing 10 and are formed as an integral part of the cover 21. For the purpose of assembling, however, the lugs 33 are split, as at 34, the two parts being secured together by bolts 35.

The rear opening 18 is closed by a stamped metal cover 36, as by a series of bolts 37, and depressions 38 are formed in this cover so that the cover may also be secured to bosses 39 formed on the rear ends of the lugs 33. Bolts 40 constitute the means for thus securing the cover 36 to the lugs.

Each of the outer ends of the axle casing 10 has secured to it a brake support 41, which, together with a bracket 42, supports the brake actuating device 43. The brake support 41 also forms a support for the outer bearing 44 for the driving axle section 45, it being understood that there are two of these axle sections, each of which is connected to its respective gear in the differential.

A spring pad 46 and radius rod bracket 47 are also properly secured to the axle casing 10 at the cylindrical part 11 thereof.

To reinforce or further strengthen the axle casing and for the purpose of forming oil pockets in the tapered portions of the axle casing, tubes 48 are secured within the casing, being preferably welded and riveted to the cylindrical ends thereof and extending inwardly therefrom toward the central portion of the casing. The inner ends of these tubes 48 are separated from the adjacent portions of the casing, thereby forming oil pockets 49, which may be denominated the end oil pockets as distinguished from the inner oil pockets that will be presently described.

The inner ends of the tubes 48 are supported in the casing by supports 50, which may be in the form of stamped steel disks having inner and outer flanges secured as by welding to the tubes and casing. By this arrangement of the supports 50 transverse walls are formed adjacent the ends of the tubes 48, thereby creating oil pockets on both sides of the differential gearing, which oil pockets may be denominated inner pockets as distinguished from the end pockets hereinabove described. To make these inner pockets more effective, the inner flanges of the supports 50 may be extended inwardly toward the differential beyond the inner ends of the tubes 48 and in fact in close proximity to the lugs 33 so that very little, if any, oil could be splashed into the inner ends of these extensions. These extensions 51 of the supports 50 may also support washers 52 which surround the axle sections 45 and thereby prevent the oil from leaking out through the tube 48.

By reference to Fig. 2, it will be seen that the channels 16, hereinabove referred to, pass under and over the disks or supports 50 and thereby connect the inner and end oil pockets. By this construction the greater part of the oil in the central enlarged portion of the axle casing is retained therein and splashed onto the gears and bearings, yet considerable oil may be used without fear of its overflowing into the tubes 48, even when the vehicle tips considerably, as in such case the outer pockets 49 will take much of the oil and return it to the enlarged portion of the casing when the vehicle rights itself.

From the above description it will be observed that the bearings for the differential gearing and the driving shaft 25 are assured of constant alinement by reason of being mounted in a single casting, and none of these bearings are in any way affected by strains put upon the axle casing, because they are entirely independent of the tubes 48 which transfer many of the strains to the casing through the supports 50.

It will be perceived also that this construction requires very little machine work on the axle casing, practically all of the accurate machine work being done upon the cover 21 and its associated parts. This of course facilitates manufacture considerably.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, the combination of a stationary axle casing having a central enlarged portion and an opening in said portion, a cover for said opening, a differential gearing in said enlarged portion having bearings in said cover, tubes extending inwardly from the ends of the axle casing and having their inner ends separated therefrom, supports in the casing for the inner ends of said tubes, and axle sections in the casing directly supported on bearings mounted on the outer ends thereof and extending into said differential gearing.

2. In a motor vehicle, the combination with an axle casing having a central enlarged portion, tubes extending inwardly from the end portions of said casing and having their inner ends separated from the casing, and supports in the casing for the inner ends of said tubes, of a differential gearing in the enlarged portion of the casing, axle sections connected with said differential gearing and extending outwardly through the ends of the casing, and bearings for the differential gearing and axle sections mounted independently of said tubes and supports.

3. In a motor vehicle, the combination of an axle casing having a central enlarged portion and front and rear openings in said portion, tubes extending from the end portions of said casing toward said central portion, a cover for one of said openings having inwardly extending bearing lugs, a driving axle in the casing partly inclosed by said tubes and mounted in bearings in said lugs, a cover for the other of said openings secured to the casing, and means for rigidly securing said latter cover directly to said lugs.

4. An axle casing comprising an outer casing having a central enlarged portion, tubes secured within the outer casing and extending toward the center thereof with their inner ends separated from the outer casing, and supports formed separately from said outer casing and tube supporting the inner end of the tube from the outer casing wall and having a washer supporting part extending inwardly from the inner end of said tube.

5. An axle casing comprising an outer casing having a central enlarged portion, cylindrical end portions, and tapered intermediate portions, tubes secured within said outer casing for reinforcing the end portions and forming oil pockets in the tapered portion, and disk shaped supports for the inner ends of said tubes and having inner and outer flanges for connection to said tubes and outer casing respectively.

6. An axle casing comprising an outer casing having a central enlarged portion, cylindrical end portions, and tapered intermediate portions, tubes secured within said outer casing for reinforcing the end portions and forming oil pockets in the tapered portion, and disk shaped supports for the inner ends of said tubes and having inner and outer flanges for connection to said tubes and outer casing respectively, said supports also having washer supporting parts extending inwardly from the inner ends of the tubes.

7. In a motor vehicle, a built-up axle comprising a stamped and welded outer casing having a central enlarged portion and an opening in said portion, tubes for reinforcing the outer ends of the casing and extending inwardly toward the center of the casing, disk shaped supports in the casing for the inner ends of the tubes, and a cover for said opening having bearing lugs in the casing independent of said tubes and supports.

8. In a motor vehicle, the combination of an axle casing having a central enlarged portion, a differential gearing mounted in said portion, axle sections connected to said gearing and extending into the ends of the casing, tubes surrounding said axle sections and extending inwardly from adjacent the ends of the casing to points adjacent said gearing, the inner ends of said tubes being separated from said casing thereby forming outer oil pockets, and supports in the casing for the inner ends of said tubes, said supports comprising transverse walls between the tubes and casing and thereby forming inner oil pockets at the side of said gearing, and said casing having channels formed therein connecting the respective end and inner oil pockets.

9. In a motor vehicle, the combination of an axle casing having a central enlarged portion, a differential gearing mounted in said portion, axle sections connected to said gearing and extending into the ends of the casing, tubes surrounding said axle sections and extending inwardly from adjacent the ends of the casing to points adjacent said gearing, the inner ends of said tubes being separated from said casing thereby forming outer oil pockets, supports in the casing for the inner ends of said tubes, said supports comprising transverse walls between the tubes and casing and thereby forming inner oil pockets at the side of said gearing, and said supports having inward extensions about said axle sections, and washers around said axle sections and supported in said extensions, said casing having channels formed therein connecting the respective end and inner oil pockets.

10. In a motor vehicle, the combination of an axle casing having a central enlarged portion, a differential gearing mounted in said portion, axle sections connected to said gearing and extending into the ends of the casing, tubes surrounding said axle sections and extending inwardly from adjacent the ends of the casing to points adjacent said gearing, the inner ends of said tubes being separated from said casing, and supports in the casing for the inner ends of said tubes, said supports comprising transverse walls between the tubes and casing, and thereby forming oil pockets at each side of said gearing.

In testimony whereof I affix my signature in the presence of two witnesses.

JESSE G. VINCENT.

Witnesses:
GEORGE L. McCAIN,
LE ROI J. WILLIAMS.